(12) United States Patent
Norman et al.

(10) Patent No.: US 12,123,496 B2
(45) Date of Patent: Oct. 22, 2024

(54) MESH FLANGE GASKETS AND METHODS OF MANUFACTURE THEREOF

(71) Applicant: LGC US Asset Holdings, LLC, Houston, TX (US)

(72) Inventors: Dale Norman, Houston, TX (US); Cuong Phan, Rosenberg, TX (US)

(73) Assignee: LGC US ASSET HOLDINGS, LLC, Houston, TX (US)

( * ) Notice: Subject to any disclaimer, the term of this patent is extended or adjusted under 35 U.S.C. 154(b) by 0 days.

(21) Appl. No.: 18/105,140

(22) Filed: Feb. 2, 2023

(65) Prior Publication Data
US 2024/0263701 A1 Aug. 8, 2024

(51) Int. Cl.
*F16J 15/06* (2006.01)
*F16J 15/10* (2006.01)
*F16L 23/18* (2006.01)
*F16L 23/22* (2006.01)

(52) U.S. Cl.
CPC ........... *F16J 15/064* (2013.01); *F16J 15/104* (2013.01); *F16L 23/18* (2013.01); *F16L 23/22* (2013.01)

(58) Field of Classification Search
CPC ........ F16J 15/064; F16J 15/102; F16J 15/104; F16L 23/18; F16L 23/22
See application file for complete search history.

(56) References Cited

U.S. PATENT DOCUMENTS

| | | | | |
|---|---|---|---|---|
| 3,877,895 A * | 4/1975 | Wonderland | ............. | F16T 1/34 138/44 |
| 5,456,475 A * | 10/1995 | Abraham | ............. | F16J 15/3284 384/473 |
| 5,758,882 A * | 6/1998 | Torzewski | ............. | F16J 15/064 277/918 |
| 6,547,255 B1 * | 4/2003 | Donaway | ............ | F16L 19/0212 277/626 |
| 8,052,151 B2 * | 11/2011 | Kurth | .................. | F16L 27/0816 277/572 |
| 9,987,577 B2 * | 6/2018 | Yoder | .................... | F16J 15/122 |
| 10,088,048 B2 * | 10/2018 | Claus | .................... | F16L 23/003 |
| 10,955,055 B2 * | 3/2021 | Evans | .................... | F16J 15/125 |
| 11,054,074 B2 * | 7/2021 | Heon | .................... | F16L 37/008 |
| 2007/0063452 A1 * | 3/2007 | Kurth | .................. | F16L 27/1017 277/572 |

(Continued)

*Primary Examiner* — Nicholas L Foster
(74) *Attorney, Agent, or Firm* — Alexander B. Uber; Gray Reed

(57) ABSTRACT

The disclosed principles provide for novel flange gaskets having a mesh filter and methods of manufacture thereof. Disclosed mesh flange gaskets provide a combination of quality seal, even at low clamp loads, with a filter for filtering out unwanted particulates, as well as manufacturing at a low cost. In one aspect, the disclosed principles utilize expanded PTFE, or other similar sealing material, on the outer section of a circular mesh positioned over the central bore of the flange and which is sandwiched between the two halves of a corrugated plastic gasket. The two halves of the flange gasket are then attached to each other with the ePTFE impregnated mesh therebetween. With this composition, the ePTFE impregnated mesh becomes part of the seal of the overall flange gasket. This provides low load sealing on the top and bottom of the gasket against the flanges, and prevents leakage through the middle barrier layer.

18 Claims, 6 Drawing Sheets

(56) References Cited

U.S. PATENT DOCUMENTS

2013/0082447 A1* 4/2013 Evans ............... B29C 45/14778
156/196
2015/0060352 A1* 3/2015 Yoder .................... F16J 15/064
277/627
2018/0274680 A1* 9/2018 Evans ...................... F16J 15/20

* cited by examiner

MESH FLANGE GASKETS AND METHODS OF MANUFACTURE THEREOF

TECHNICAL FIELD

This disclosure relates to the field of sealing flange connections, and more particularly to novel mesh flange gaskets and methods of manufacture thereof.

BACKGROUND

Many piping situations have a need for a filter to prevent trace particulate matter from getting into critical equipment, such as valves. One solution is to install a wire mesh filter into the pipe to act as such a filter. However, the conventional installation of a mesh filter into the piping has proven not to be a simple and inexpensive endeavor, and conventional approaches have also proven to be unreliable. One area where a mesh filter could be placed is within a flange connection between two sections of piping used to transport fluids, both liquids and gases.

Employing a gasket with a mesh filter into such pipe flange unions has proven difficult to do reliably. Existing approaches are either too costly because of their manufacturing processes, or too difficult to reliably secure a metal mesh filter between non-metal gasket materials, such a polytetrafluoroethylene (PTFE). Additionally, some types of conventionally available filter gaskets, like spiral wound, or grooved metal with a mesh covering, are very expensive or have higher clamp load requirements and thus cannot be employed in low load flanges, such as cast-iron, Fiberglass Reinforced Plastic (FRP), or glass lined flanges. Also, connections requiring electrical isolation with the mesh filter pose unique challenges with having a cost effective solution that the principles disclosed herein address.

Accordingly, what is needed in the art is a new flange gasket having a mesh filter that is inexpensive and easy to manufacture, and provides leak-free use in low clamp load applications. The disclosed principles provide for such unique flange gaskets and methods of manufacture thereof.

SUMMARY

The disclosed principles provide for novel flange gaskets having a mesh filter for use in flanged piping unions, and methods of manufacture thereof. The disclosed mesh flange gaskets provide a combination of quality seal, even at low clamp loads, with a filter for filtering out unwanted particulates, as well as manufacturing at a low cost. Disclosed mesh flange gaskets are deployable in flowlines where filtering mesh can be used to catch particulate matter, for example, 2" or 3" natural gas lines or meters, or even liquid media that might require NSF 61 or FDA certification. Disclosed flanges are also particularly useful in low load flanges, such as cast iron, FRP, or glass lined flanges.

In one aspect, the disclosed principles utilize expanded PTFE (ePTFE), or other similar sealing material, on the outer section of a circular mesh positioned over the central bore of the flange and which is sandwiched between the two halves or portions of a corrugated plastic gasket. The two halves of the flange gasket are then attached to each other with the ePTFE impregnated mesh therebetween and covering the bore of the flange gasket. With this composition, the ePTFE impregnated mesh becomes part of the seal of the overall flange gasket. This provides low load sealing on the top and bottom of the gasket against the flanges, and prevents leakage through the middle barrier layer. In other aspects, a metal mesh material may be affixed to a metal internal gasket, and then sandwiched between two halves of the flange gasket comprised of PTFE or other similar plastic material. In the various embodiments of the disclosed principles discussed herein, mention of materials such as PTFE, filled PTFE, virgin PTFE, or ePTFE or the like are intended to include any similar material, including any number of plastics, polymers and other synthetics, either now existing or later developed. As such, no limitation to any particular plastic or synthetic material is intended or should be implied unless expressly stated for exemplary embodiments.

BRIEF DESCRIPTION OF THE DRAWINGS

The novel features believed characteristic of the disclosure are set forth in the appended claims. The disclosure itself, however, as well as a preferred mode of use, further objectives, and advantages thereof, will be best understood by reference to the following detailed description of illustrative embodiments when read in conjunction with the accompanying drawing, in which:

DETAILED DESCRIPTION

Figure 1:
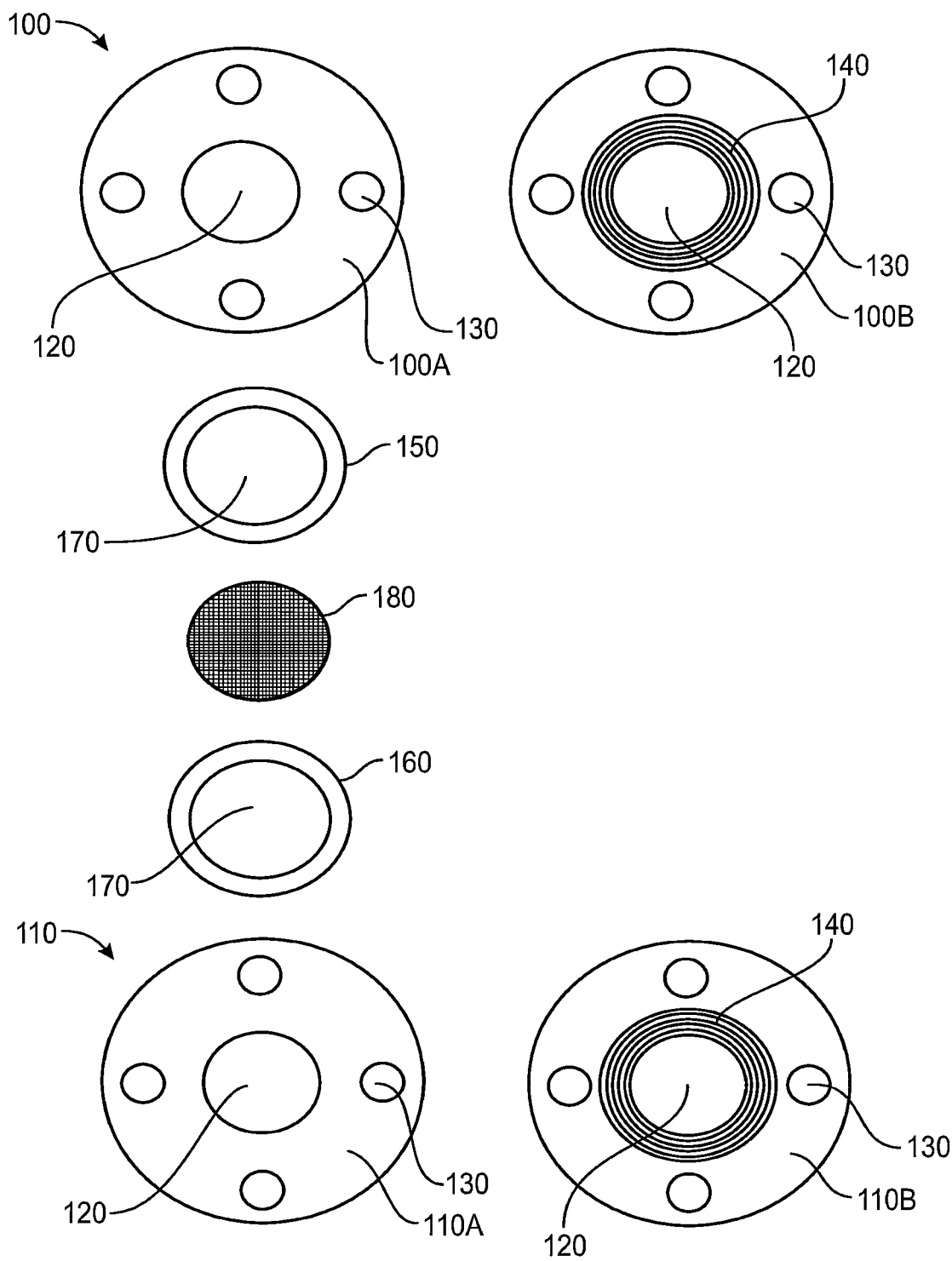
FIG. 1 illustrates the components for one embodiment of a flange gasket designed and constructed in accordance with the disclosed principles.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Although multiple embodiments are shown and discussed in great detail, it will be apparent to those skilled in the relevant art that some features that are not relevant to the present invention may not be shown for the sake of clarity.

Looking initially at FIG. 1, illustrated are the components for one embodiment of a flange gasket designed and constructed in accordance with the disclosed principles. This embodiment includes a first gasket portion 100 and a second gasket portion 110. FIG. 1 illustrates both an interior view of the first gasket portion 100A and an exterior view of the first gasket portion 100B. The first gasket portion 100 includes a central bore 120 for flow of a fluid to pass through, as well as apertures 130 for fasteners used to affix pipe flanges (not illustrated), in between which the disclosed flange gasket is used, to one another.

Additionally, the exterior side of the first gasket portion 100B includes corrugation 140 or serrations formed around the central bore 120. These corrugations 140 or serrations can be formed in various ways. In a first example, the corrugations 140 may be formed at the beginning of process used to form the first and second gasket portions 100, 110. In a second example, the corrugations 140 may be formed toward the end of process on the exterior surface of the final assembled gasket. In such example, the first and second portions 100, 110 will remain flat on both sides from the beginning of the manufacturing process until the corrugation 140 forming process.

Once formed, regardless of the process employed, the corrugation 140 may be provided on the exterior surface so as to provide a sealing surface of the first gasket portion 100 against the mounting face of a pipe flange. The corrugation 140 may be provided as alternating grooves and peaks formed into the exterior surface of the first gasket portion 100B. The corrugation 140 may be formed in one of the manners disclosed in U.S. Pat. No. 11,280,410, which is co-owned with the present disclosure and is incorporated herein by reference in its entirety. Thus, in a specific embodiment, each of the plurality of grooves of the corrugation 140 defines a sidewall angle that is between about 60 degrees to about 120 degrees.

The material used to form the first gasket portion 100 may be non-metal, and in specific embodiments may be comprised of polytetrafluoroethylene (PTFE). In certain embodiments, the material of the first gasket portion 100 may be Matrix® L110 PTFE or another material of similar malleability. Of course, other materials may also be used for forming the first gasket portion 100. As such, the plurality of peaks forming the corrugation 140 are compressible to a substantially flat configuration when a load is applied to the faces of the gasket portions 100, 110.

Also illustrated in FIG. 1 are a view of the interior surface of the second gasket portion 110A and a view of the exterior surface of the second gasket portion 110B. The second gasket portion 110 also includes a central bore 120 for fluid flow therethrough, as well as apertures 130 for fasteners that align with the apertures 130 in the first gasket portion 100. The second gasket portion 110 also includes the same or similar corrugation 140 as discussed above for the first gasket portion 100, and which may be formed in the same or similar manner described above. Also as before, the second gasket portion 110 may be comprised of non-metal material, such as PTFE, and in specific embodiments is comprised of Matrix® L110 PTFE. But also as with the first gasket portion 100, other materials may also be employed to form the second gasket portion 110. In exemplary embodiments, the thickness of the first and second gasket portions 100, 110 may be about 1/16" (0.0625"); however, any advantageous thicknesses for the first and second gasket portions 100, 110 may be employed, and which may be selected depending on the application and/or the material selected for the first and second gasket portions 100, 110.

Also illustrated in FIG. 1 are first and second washers 150, 160, which in some respect are gaskets of their own and which each include a central bore 170. The bores 170 are also sized for fluid flow therethrough, and in some exemplary embodiments are configured to align with central bores 120 formed in the first and second gasket portions 100, 110 discussed above. In exemplary embodiments, the bores 170 are the same size and the bores 120 formed in the first and second gasket portions 100, 110, but may alternatively be formed larger than the bores 120 of the first and second gasket portions 100, 110 to ensure no interference with fluid flow therethrough occurs should alignment of the washers 150, 160 with the first and second gasket portions 100, 110 be slightly non-concentric. The outer diameter of the first and second washers 150, 160, in exemplary embodiments, may be slightly non-concentric, and maybe formed to any advantageous diameter(s).

FIG. 1 also illustrates a mesh 180, which is configured to be positioned between the first and second washers 150, 160, and thereby secured in place by the washers 150, 160. As such, the mesh 180 comprises a diameter that is larger than the diameter of the bores 170. In some embodiments, the diameter of the mesh 180 is substantially equal to the outer diameters of the first and second washers 150, 160 so as to receive maximum coverage and grip by the first and second washers 150, 160 along the outer edges of the mesh 180 when the mesh 180 is held therebetween. In exemplary embodiments, the mesh 180 is a metal material, such as stainless steel, but other materials may also be used to form the mesh 180. Additionally, the mesh 180 may be formed of non-metal material, depending on the application for a flange gasket constructed in accordance with the disclosed principles.

For securing the mesh 180 between the first and second washers 150, 160, the washers 150, 160 may be constructed of a non-metal material having sufficient malleability to somewhat, and sufficiently, conform to the material of the mesh 180 when the mesh 180 is compressed between the washers 150, 160, where the conforming of the washer material increases the security of the hold on the mesh 180 therebetween. In specific embodiments, the material of the washers 150, 160 may also be PTFE, and in more specific embodiments the material may specifically be Matrix® L120 expanded PTFE (ePTFE). Other non-metal materials that may be employed for the first and second washers 150, 160 include, for example, Durlon®, PEEK (poly-ether-ether-ketone) and other similar materials, as well as EPDM (ethylene propylene diene monomer) and other various types of rubber may also be used for constructing the first and second washers 150, 160.

In certain embodiments, the softness or malleability of the material comprising the first and second washers 150, 160 is greater than the softness or malleability of the material comprising the first and second gasket portions 100, 110. In yet other embodiments, the softness or malleability of the material comprising the first and second washers 150, 160 is less than the softness or malleability of the material comprising the first and second gasket portions 100, 110. However, in advantageous embodiments, the malleability of the material comprising the first and second washers 150, 160 is greater than the malleability of the mesh 180 material, and thus the first and second washers 150, 160 conform about the mesh 180 material to securely hold it in place and provide a seal between the mesh 180 and the first and second washers 150, 160.

In alternative embodiments, the first and second washers 150, 160 and mesh 180 may be formed in as a single, integral piece. For example, if the first and second washers 150, 160 are non-metal, these washers 150, 160 and the mesh 180 may be molded, e.g., via an injection or vacuum molding process, as a single unitary piece. In similar embodiments, the first and second washers 150, 160 may simply be a single washer with the mesh 180 comprised of the same material and integrally formed within the single washer. In other embodiments where the washers 150, 160 and the mesh 180 are non-metal, these components may be secured to another via a bonding process, such as via an adhesive, heat welding, chemical bonding, or any other similar technique. The terms "welding" and "bonding" and the like as used herein include any technique for combining multiple components together in a permanent or semi-permanent way, and no limitation to any particular welding or bonding technique is intended or should be implied.

Figure 2:
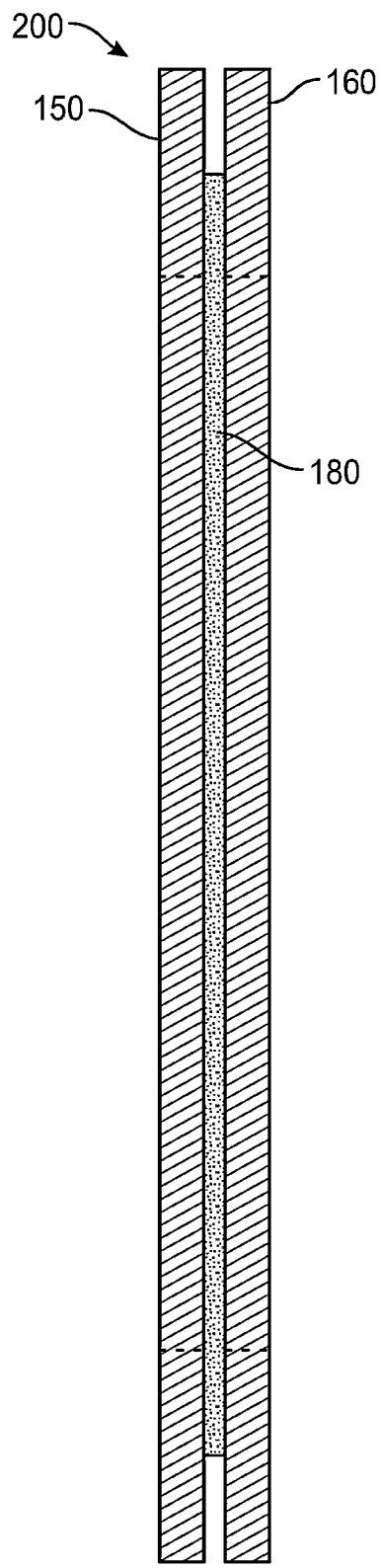
FIG. 2 illustrates a side view of one embodiment of a washer assembly constructed in accordance with the disclosed principles.

Turning now to FIG. 2, illustrated is a side view of one embodiment of a washer assembly 200 constructed in accordance with the disclosed principles. The washer assembly 200 is comprised of the first and second washers 150, 160 illustrated in FIG. 1, as well as mesh 180 positioned and held between the first and second washers 150, 160.

In exemplary embodiments, the thickness of the first and second washers 150, 160 may be about 0.020" to 0.040"; however, any advantageous thicknesses for the first and second washers 150, 160 may be employed, and which may be selected depending on the application and/or the material selected for the first and second washer 150, 160, as well as the first and second gasket portions 100, 110 between which the washer assembly 200 will be placed. Also, in exemplary embodiments, the mesh 180 may have a of a number of thicknesses depending on the application. In exemplary embodiments, the mesh 180 may have a thickness of 0.022" to 0.030", but other thicknesses are possible as well. In some specific embodiments, the mesh has a thickness of 0.025". In advantageous embodiments, the thickness of the mesh 180 may be selected to be thick enough to provide a mesh filter strong enough to withstand flow of the fluid intended to flow through the filter, but thin enough to permit the first and second washers 150, 160 to securely hold the mesh 180 therebetween, as well as the washer assembly 200 between the first and second gasket portions 100, 110.

In some embodiments of the assembly 200, a gap or space exists between the first and second washers 150, 160 where the mesh 180 is located. In other embodiments, the first and second washers 150, 160 are compressed around the mesh 180 such that little or no gap exists between the first and second washers 150, 160. Also, the first and second washers 150, 160 may be adhered together with an adhesive, and thus any such gap between them may be filled with adhesive. In a specific advantageous embodiment, the ePTFE comprising the first and second washers, 150, 160 may be glued to the mesh 180 with S77, at the top and bottom of the mesh 180. Then when the assembly of the first and second gasket portions 100, 110 to the washers 150, 160 occurs, the system is compressed together and the ePTFE is compressed onto, and between, the holes in the mesh 180 thereby sealing off the mesh 180 and sealing the components to the flat sides of the first and second gasket portions 100, 110. In other embodiments, the first and second washers 150, 160 may be heat-welded together, or any other bonding technique, to secure the mesh 180 therebetween, as discussed above. In yet other embodiments, the mesh 180 is held between the first and second washers 150, 160 when the first and second gasket portions 100, 110 are connected together, which is discussed in further detail below.

Figure 3:
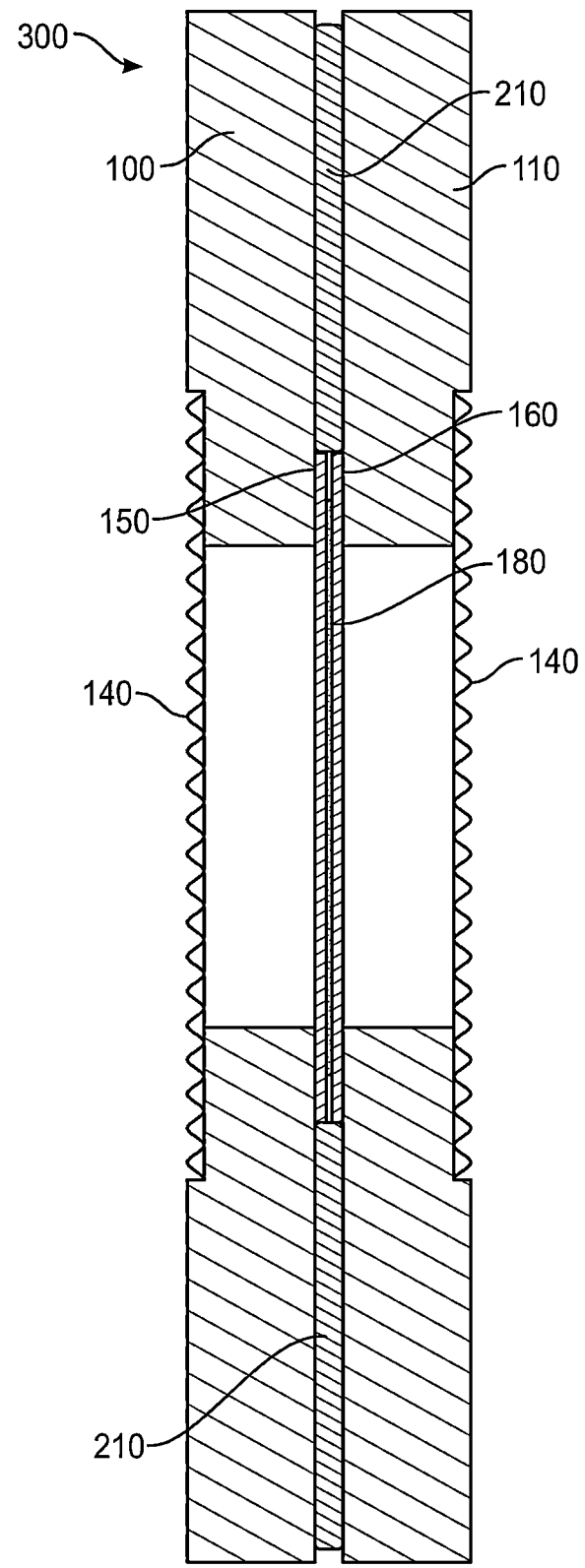
FIG. 3 illustrates a cross-sectional view of one embodiment of an assembled flange gasket in accordance with the disclosed principles.

Looking now at FIG. 3, illustrated is a cross-sectional view of one embodiment of an assembled flange gasket 300 in accordance with the disclosed principles. This illustrated embodiment of the flange gasket 300 includes the first and second gasket portions 100, 110 discussed above with reference to FIG. 1. Additionally, the flange gasket 300 includes the washer assembly 200 illustrated in FIG. 2, which includes the first and second washers 150, 160, as well as the mesh 180 secure therebetween.

The corrugations 140 on the exterior surfaces of the first and second gasket portions 100, 110 may also be seen in this illustrated embodiment, and thus the washer assembly 200 is secured on the interior surfaces of the first and second gasket portions 100, 110, which do not include corrugation. Of course, in other related embodiments, the outer surfaces of the first and second gasket portions 100, 110 do not include corrugation 140, may include entirely smooth exterior surface, or may instead include a different textured or non-smooth surface that may or may not benefit sealing of the assembled gasket. Also, in some embodiments the entire exterior surfaces of the first and second gasket portions 100, 110 may include corrugation 140 or a different pattern of texture or non-smooth surface that may or may be included for enhancing sealing of the assembled gasket.

Securing the washer assembly 200 on the non-corrugated interior surfaces of the first and second gasket portions 100, 110 permits a more secure positioning of the washer assembly 200 between the first and second gasket portions 100, 110. In some embodiments, the washer assembly 200 is secured between the first and second gasket portions 100, 110 by a press-fit when the first and second gasket portions 100, 110 are affixed to one another. In other embodiments, an adhesive between the washers 150, 160 of the washer assembly 200 and the interior surfaces of the first and second gasket portions 100, 110 may be used to secure the washer assembly 200 therebetween. In yet other embodiments, other bonding techniques, such as heat welding, may be employed to secure the washer assembly 200 between the first and second gasket portions 100, 110.

For assembly of the flange gasket 300, the first and second gasket portions 100, 110 are affixed or otherwise joined to one another, thereby securing the washers 150, 160 and the mesh 180 between the first and second gasket portions 100, 110, as described above. The central bores in each component should be aligned so that fluid may pass through each component once the assembled flange gasket 300 is installed at the union of two pipe flanges. In one embodiment, the first and second gasket portions 100, 110 are adhered to one another using an adhesive 210. In such an exemplary embodiment, 3M 77 adhesive may be used to bond the first and second gasket portions 100, 110; however, other adhesives may also be employed. Additionally, an adhesive 210 may be used to bond the washer assembly 200 between the first and second gasket protions 100, 110. Alternatively, the first and second gasket portions 100, 110 may be bonded in any other manner, such as by heat welding, chemical bonding, mechanical means, etc. In short, the disclosed principles are not limited to any particular means or manner for joining the first and second gasket portions 100, 110 together with the washers 150, 160 and mesh 180 therebetween.

Figure 4:
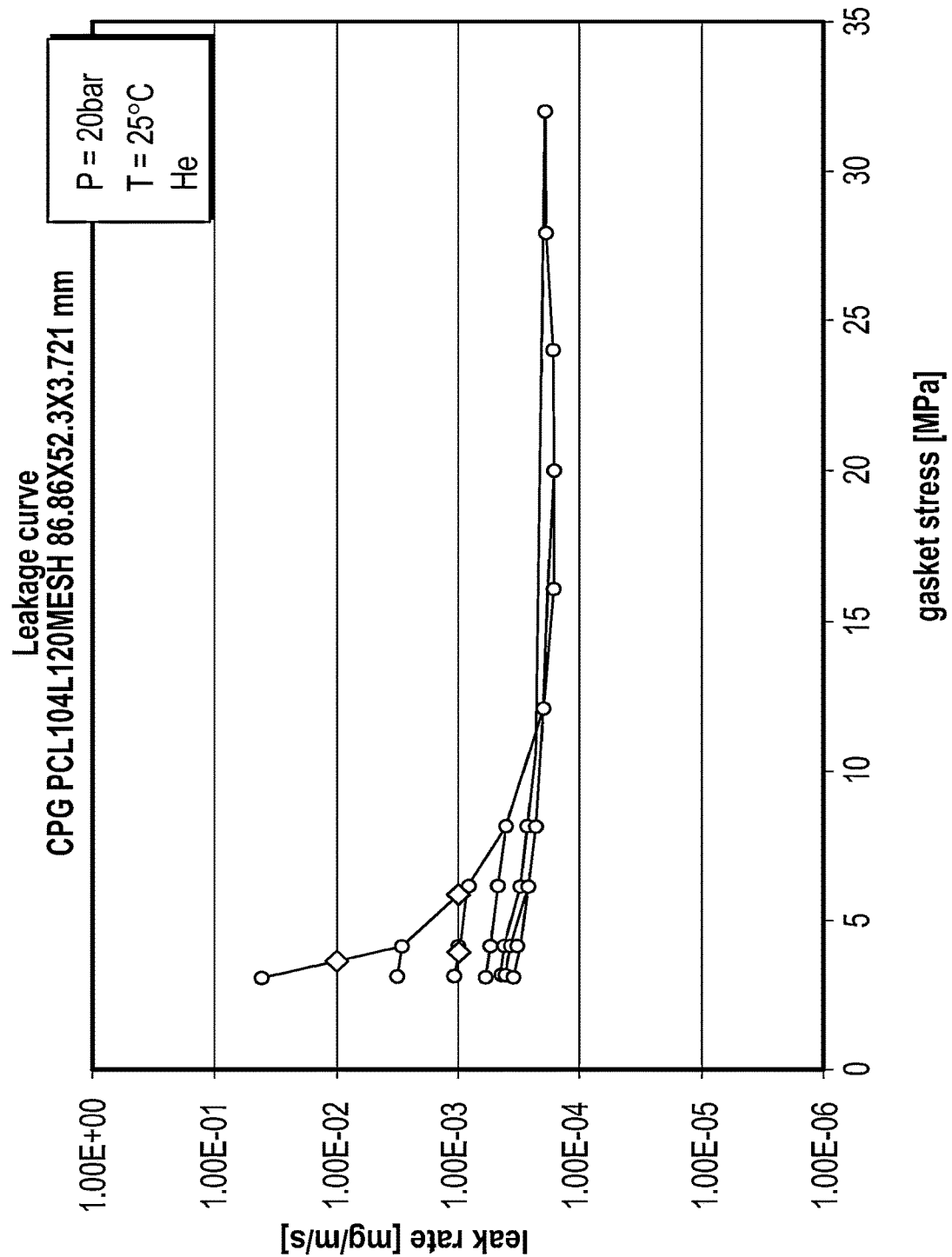
FIG. 4 illustrates a chart illustrating the results of a leakage test performed on a flange gasket constructed in accordance with the embodiment illustrated in FIG. 3.

Referring now to FIG. 4, illustrated is a chart illustrating the results of a leakage test performed on a flange gasket 300 constructed in accordance with the embodiment illustrated in FIG. 3. A flange gasket comprised of first and second gasket portions constructed from Matrix® L-110 PTFE having a 0.040" thickness each, and having first and second washers 150, 160 constructed of Matrix® L-120 PTFE, each with a thickness of 0.020", with a stainless-steel mesh 180 having a thickness of 0.025" therebetween, was employed for the leakage test illustrated in FIG. 4. The fluid passed through the flange gasket 300 was Helium, at a pressure of 20 bars and at a temperature of 25° C. The successful leakage test under these parameters of this embodiment of the flange gasket porivded as disclosed above is illustrated in the chart of FIG. 4. For example, as illustrated in the chart, the exemplary gasket has an industry recognized leak rate better than L0.001 (European standard) or Tightness class 3 (T3, USA standard), both at or below 6 MPa, or 870 psi, gasket stress, which is a very low load for such a tight seal.

Figure 5:
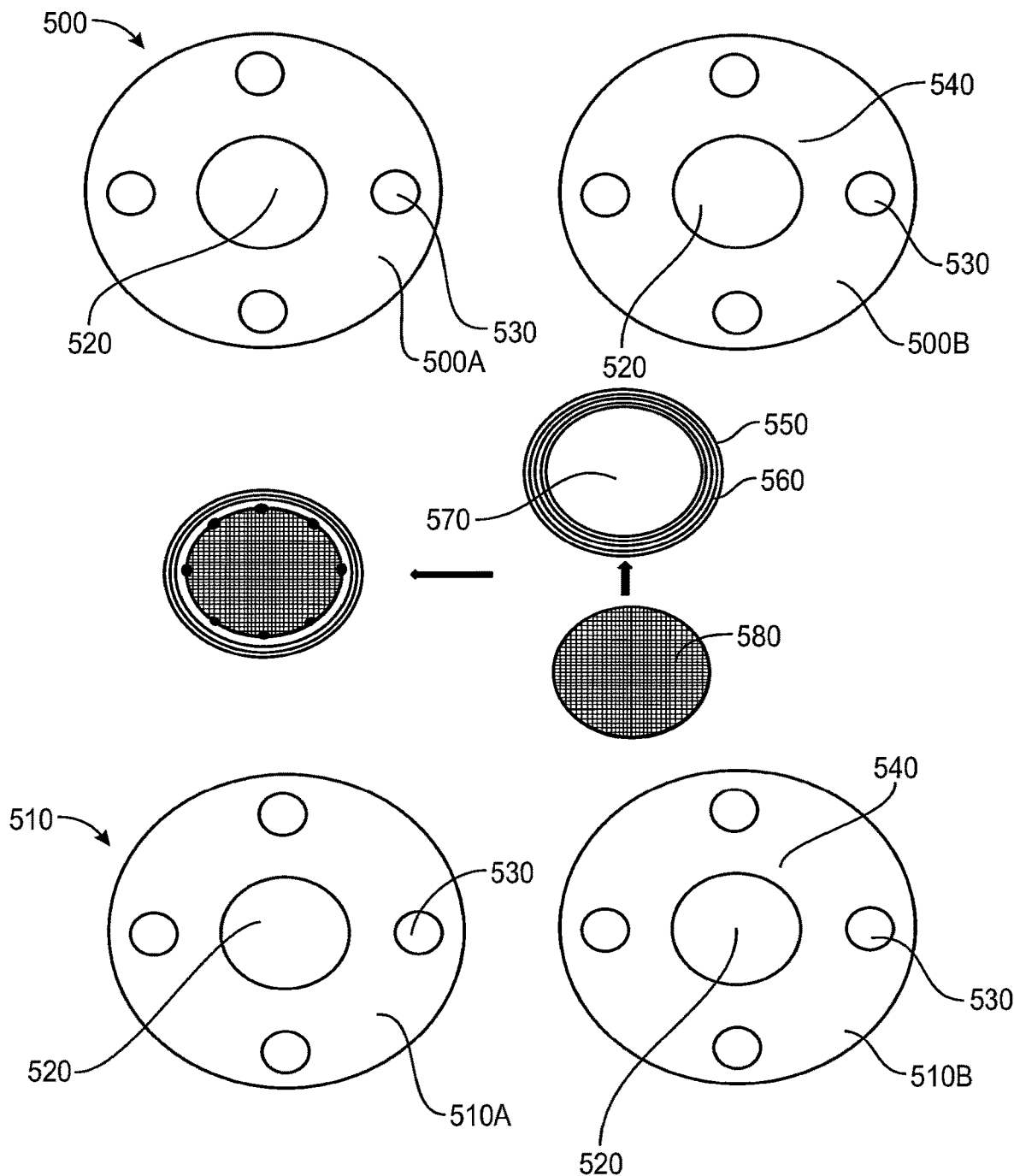
FIG. 5 illustrates the components for another embodiment of a flange gasket designed and constructed in accordance with the disclosed principles.

Turning now to FIG. 5, illustrated are the components for another embodiment of a flange gasket designed and constructed in accordance with the disclosed principles. As before, this embodiment includes a first gasket portion 500 and a second gasket portion 510. An interior view of the first gasket portion 500A and an exterior view of the first gasket portion 500B are also shown. The first gasket portion 500 again includes a central bore 520 for flow of a fluid therethrough, as well as apertures 530 for fasteners used to affix pipe flanges (not illustrated), in between which the flange gasket is used, to one another.

Unlike the embodiments discussed above, the exterior side of the first gasket portion 500B is a smooth surface 540 and thus does not include corrugation or serrations formed around its central bore 520. The material used to form the first gasket portion 500 may again be non-metal, and in specific embodiments may be comprised of PTFE. In more specific embodiments, the material of the first gasket portion 500 may be Matrix® L-120 ePTFE or another material of similar malleability. Of course, other materials may also be used for forming the first gasket portion 500, as desired or selected per application/use.

Also illustrated in FIG. 5 are a view of the interior surface of the second gasket portion 510A and a view of the exterior surface of the second gasket portion 510B. The second gasket portion 510 also includes a central bore 520 for fluid flow therethrough, as well as apertures 530 for fasteners that align with the apertures 530 in the first gasket portion 500. The second gasket portion 510 also includes the same smooth contact surface 540 as discussed above for the first gasket portion 500. Also as before, the second gasket portion 510 may be comprised of non-metal material, such as PTFE, and in some embodiments is comprised of Matrix® L-120 ePTFE. As with the first gasket portion 500, other materials may also be employed to form the second gasket portion 510. In exemplary embodiments, the thickness of the first and second gasket portions 500, 510 may be about 1/16" (0.0625"); however, any advantageous thicknesses for the first and second gasket portions 500, 510 may be employed, and which may be selected depending on the application and/or the material selected for the first and second gasket portions 500, 510.

Also illustrated in FIG. 5 is a single washer or internal gasket 550 which includes a central bore 570. This central bore 570 is also sized for fluid flow therethrough, and is configured to align with central bores 520 formed in the first and second gasket portions 500, 510 discussed above. As before, in exemplary embodiments, the bore 570 is the same size and the bores 520 formed in the first and second gasket portions 500, 510, but may alternatively be formed larger than the bores 520 of the first and second gasket portions 500, 510 to ensure no interference with fluid flow therethrough occurs should alignment of the internal gasket 150 with the first and second gasket portions 500, 510 by non-concentric.

In this embodiment of a flange gasket in accordance with the disclosed principles, the internal gasket 550 may be comprised of metal. More specifically, such a metal internal gasket 550 may further include corrugation 560 on one or both of its faces. In this illustrated embodiment, the internal gasket 550 comprises corrugation 560 on both of its faces that contact the first and second gasket portions 500, 510. An example of such a metal internal gasket 550 may be one of the family of Corrugated Metal Gaskets (CMGs) of Lamons Manufacturing and Service Co., who is the assignee of the present disclosure. Lamons' CMG family of metal internal gaskets comprise a unique corrugation which viewed in cross-section has a sinusoidal profile, and which is advantageous for use in flange gaskets constructed in accordance with the disclosed principles. Of course, other embodiments of the metal internal gasket 550 may also be chosen, as desired or needed, or a metal internal gasket 550 with a different shape or pattern of corrugation may be employed.

FIG. 5 also illustrates a mesh 580, which is configured to be positioned on or inside the internal gasket 550. In advantageous embodiments, the mesh 580 is positioned within the bore 570 of the internal gasket 550, and thus the mesh 580 comprises a diameter that is substantially equal to the diameter of the bore 570. In some embodiments, the diameter of the mesh 580 is attached to the center thickness of the bore 570. To secure the mesh 580 to the internal gasket 550, the mesh 580 can be comprised of a metal compatible with the metal comprising the internal gasket 550, and then welded to the internal gasket 550. In exemplary embodiments, the mesh 580 and the internal gasket 550 are both formed of stainless steel, but other metals for each component, whether the same or not may also be used to form the mesh 580 and the internal gasket 550.

In the illustrated embodiment, the mesh 580 is tack welded to the internal gasket 550 in several places, which could include using spot welding, MIG welding, TIG welding, or any other advantageous welding technique. In some embodiments, the mesh 580 may be welded to the internal gasket 550 using a full bead around the perimeter of the mesh 580, accomplished using any of the above-mentioned techniques. In yet other embodiments, the mesh 580 may be affixed to the internal gasket 550 using another bonding technique, such as using an adhesive, or even a press or friction fit if the mesh 580 includes a border that may be snapped into the internal gasket 550. Of course, any advantageous technique for affixing the mesh 580 and the internal gasket 550 together may be employed. Additionally, the mesh 580 may be welded directly to the inner diameter of the gasket 550, or may be welded to other portions of the gasket 550, or may be welded to one or more portions of the first and/or second gasket portions 500, 510 when the components are made of compatible materials, or just portions of the first and/or second gasket portions 500, 510 are made of materials compatible with the mesh 580.

In alternative embodiments, the internal gasket 550 and the mesh 580 are both comprised of non-metal materials. In such embodiments, the mesh 580 may be affixed to the internal gasket 550 using adhesives, heat welding, chemical bonding, or any other advantageous technique. As before, the mesh 580 may be bonded directly to the inner diameter of the gasket 550, or may be bonded to other portions of the gasket 550, or may be bonded to one or more portions of the first and/or second gasket portions 500, 510. Also, in embodiments where the mesh 580 and the internal gasket 550 are comprised of the same non-metal material, the two may be formed together as a unitary piece. For example, the two may be formed by molding the two in a single operation, such as through injection molding. Other techniques for simultaneously forming the mesh 580 and the internal gasket 550 as a unitary non-metal (or metal) piece may also be employed, as desired.

Figure 6:
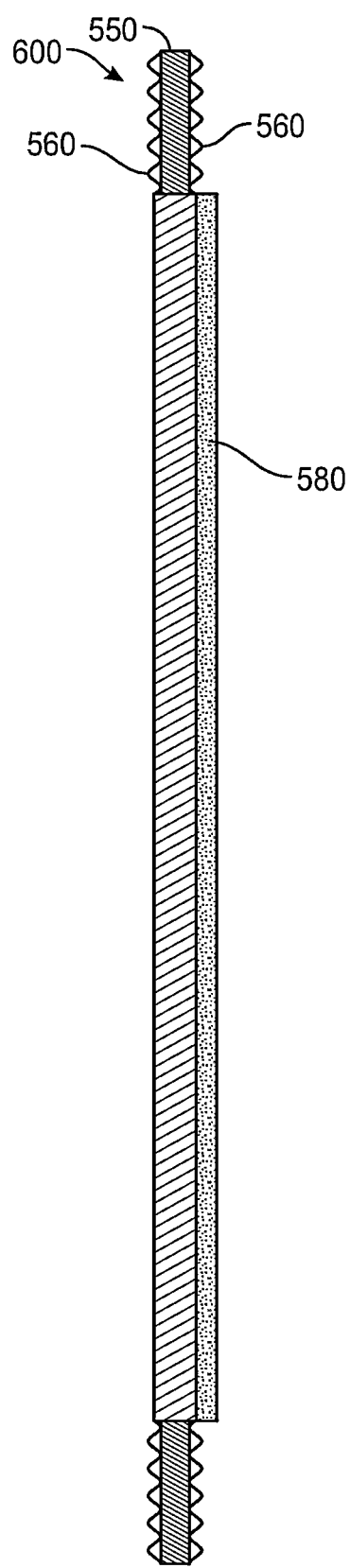
FIG. 6 illustrates a cross-sectional side view of an embodiment of an internal gasket assembly constructed in accordance with the disclosed principles.

FIG. 6 illustrates a cross-sectional side view of an embodiment of an internal gasket assembly 600 constructed in accordance with the disclosed principles. The internal gasket assembly 600 is comprised of the internal corrugated gasket 550 illustrated in FIG. 5, as well as mesh 580 positioned and held across the bore 570 of the internal gasket 550. The external corrugations 560 on both faces of the internal gasket 550 may also be seen in this illustrated embodiment.

In exemplary embodiment, the thickness of the internal corrugated gasket 550 is about 0.020-0.040", and in a specific embodiment is 0.030"; however, any advantageous thicknesses for the internal gasket 550 may be employed, and which may be selected depending on the application and/or the material selected for the internal gasket 550, as well as the first and second gasket portions 500, 510 between which the internal gasket 550 will be placed. Also, in exemplary embodiments, the mesh 580 may have a thickness of 0.025", but other thicknesses may also be employed. In some embodiments, the thickness of the mesh 580 is selected based on the bonding technique used to affix the mesh 580 to the internal gasket 550. In advantageous embodiments, the thickness of the mesh 580 is selected to be thick enough to provide a mesh filter strong enough to withstand flow of the fluid intended to flow through the filter, but still thin enough to permit the first and second gasket portions 500, 510 to be bonded around the internal gasket assembly 600.

Figure 7:
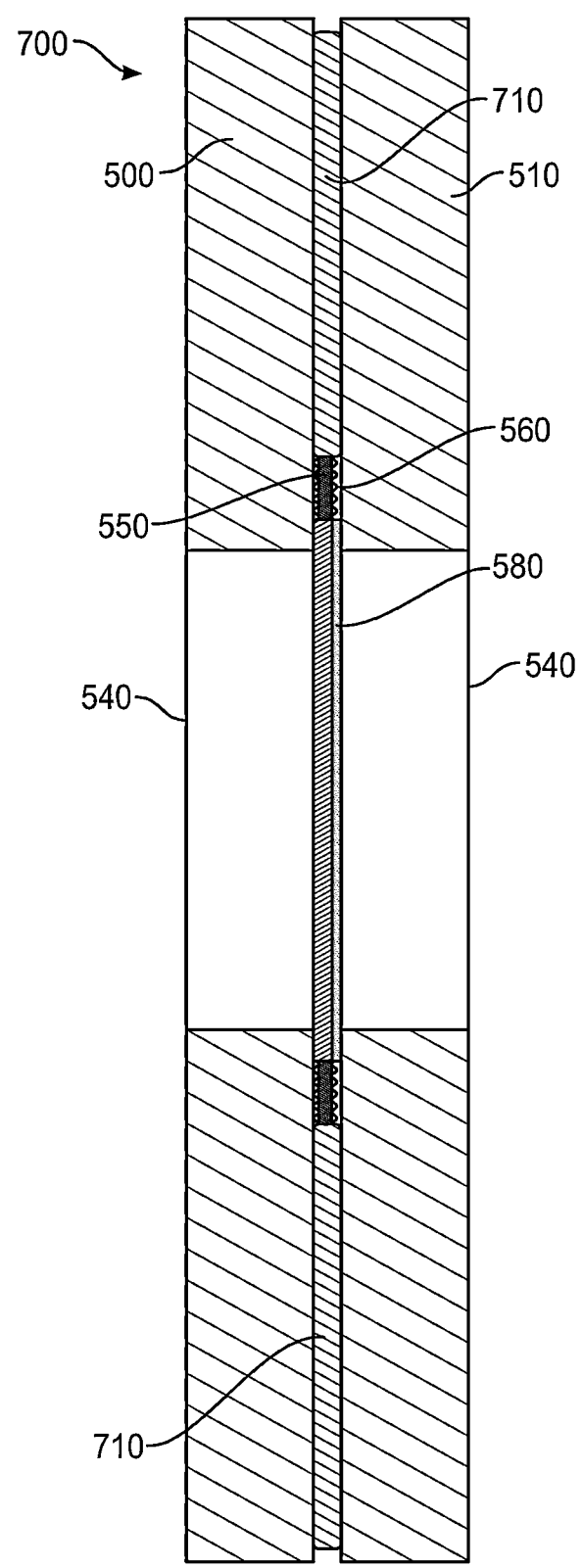
FIG. 7 illustrates a cross-sectional view of another embodiment of an assembled flange gasket in accordance with the disclosed principles.

Looking now at FIG. 7 illustrates a cross-sectional view of another embodiment of an assembled flange gasket 700 in accordance with the disclosed principles. This illustrated embodiment of the flange gasket 700 includes the first and second gasket portions 500, 510 discussed above with reference to FIG. 5. Additionally, the flange gasket 700 includes the internal gasket assembly 600 illustrated in FIG. 6, which includes the internal gasket 550, as well as the mesh 580 welded or otherwise secured to the internal gasket 550.

In this illustrated embodiment, the internal gasket assembly 600 is secured on the interior surfaces of the first and second gasket portions 500, 510, which do not include corrugation. Securing the position of the internal gasket assembly 600 on the non-corrugated interior surfaces of the first and second gasket portions 500, 510 is provided by the corrugations 560 formed on the internal gasket 550.

In exemplary embodiments, the internal gasket assembly 600 is secured between the first and second gasket portions 500, 510 by the corrugations 560 biting into the interior surfaces of the first and second gasket portions 500, 510 as the two are affixed to one another. This biting of the corrugation 560 permits a secure positioning of the internal gasket assembly 600 between the first and second gasket portions 500, 510. In other embodiments, an adhesive between the surfaces of internal gasket 550 and the interior surfaces of the first and second gasket portions 500, 510 may be used to secure the internal gasket assembly 600 therebetween. In some embodiments, both techniques may be employed to form the gasket assembly. In yet other embodiments where the internal gasket is comprised of a non-metal material, other bonding techniques, such as heat welding, may be employed to secure the internal gasket assembly 600 between the first and second gasket portions 500, 510.

To complete the assembly of the flange gasket 700, the first and second gasket portions 500, 510 are affixed or otherwise joined to one another, thereby securing the internal gasket 550 and the mesh 580 between the first and second gasket portions 500, 510, similar to the embodiment described above. The central bores in each component should again be aligned so that fluid may pass through the bore of each component once the assembled flange gasket 700 is installed at the union of two pipe flanges. In one embodiment, the first and second gasket portions 500, 510 are adhered to one another using an adhesive 710. In such an exemplary embodiment, 3M 77 adhesive may be used to bond the first and second gasket portions 500, 510; however, other adhesives may also be employed. Alternatively, the first and second gasket portions 500, 510 may be bonded in any other manner, such as by heat welding, chemical bonding, mechanical means, etc. As with the other embodiments of the flange gasket disclosed herein, the disclosed principles are not limited to any particular means or manner for joining the first and second gasket portions 500, 510 together with the internal gasket 550 and mesh 580 therebetween, to provide an assembled flange gasket 700.

Figure 8:
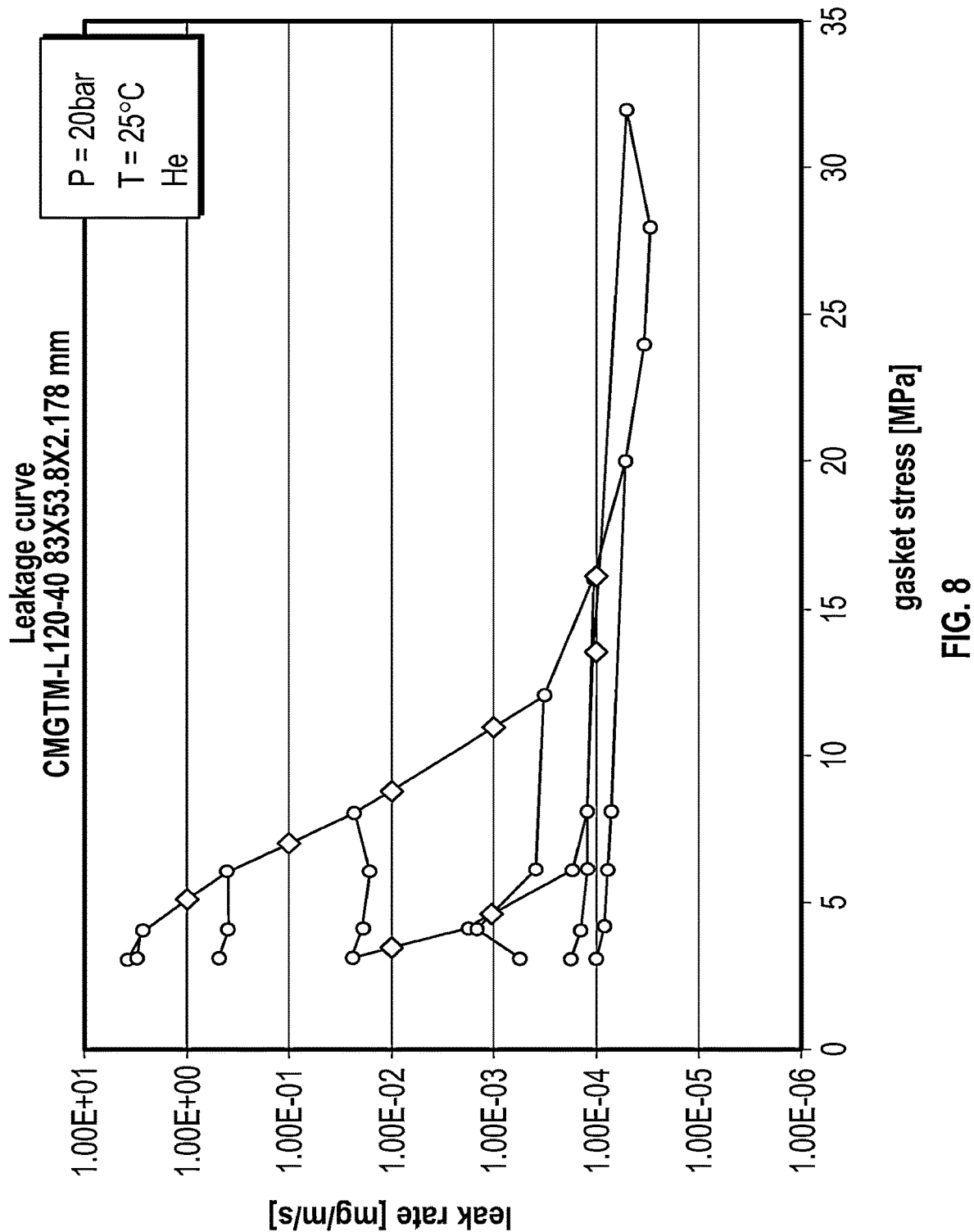
FIG. 8 illustrates a chart illustrating the results of a leakage test performed on a flange gasket constructed in accordance with the embodiment illustrated in FIG. 7.

Referring now to FIG. 8, illustrated is a chart illustrating the results of a leakage test performed on a flange gasket 700 constructed in accordance with the embodiment illustrated in FIG. 7. A flange gasket comprised of first and second gasket portions constructed from Matrix® L-120 ePTFE having a 0.040" thickness each was employed. A corrugated internal gasket comprised of metal, specifically, ASTM A240 316L, and having a thickness of about 0.030" was used, along with a metal mesh comprised of ASTM A240 316L and a thickness of 0.025". As with the prior test discussed above, the fluid passed through the flange gasket 700 was Helium, at a pressure of 20 bars and at a temperature of 25° C. The successful leakage test under these parameters of this embodiment of the flange gasket porivded as disclosed above is illustrated in the chart of FIG. 8. Specifically, as illustrated in the chart, the gasket demonstrated the ability to be better than L0.001, or T3, at 12 MPa, or 1740 psi, gasket stress, but also better than L0.0001, or Tightness class 3.5 (T3.5), at 16 MPa, or 2320 psi, gaskets stress.

While this disclosure has been particularly shown and described with reference to preferred embodiments, it will be understood by those skilled in the pertinent field art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto, as permitted by applicable law. Moreover, any combination of the above-described elements in all possible variations thereof is encompassed by the disclosure unless otherwise indicated herein or otherwise clearly contradicted by context.

Also, while various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

The uses of the terms "a" and "an" and "the" and similar references in the context of describing the invention(s) (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

Moreover, the Abstract is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the claims reflect, inventive subject matter lies in less than all features of a single disclosed embodiment. Thus, the following claims are hereby incorporated into the Detailed Description, with each claim standing on its own as a separate embodiment.

Any and all publications, patents, and patent applications cited in this specification are herein incorporated by reference as if each individual publication, patent, or patent application were specifically and individually indicated to be incorporated by reference and set forth in its entirety herein.

What is claimed is:

1. A flange gasket, comprising:
   a first gasket portion and a second gasket portion, each comprising a central bore;
   first and second washers secured between the first and second gasket portions, each of the first and second washers comprising a central bore corresponding to the central bores of the first and second gasket portions; and
   a mesh secured between the first and second washers covering the central bores of the first and second washers and the first and second gasket portions.

2. The flange gasket of claim 1, wherein the mesh is comprised of metal, and wherein a malleability of the materials comprising the first and second washers is greater than a malleability of the metal comprising the mesh, whereby the first and second washers conform about the mesh to secure the mesh between the first and second washers.

3. The flange gasket of claim 2, wherein the mesh comprises a diameter substantially equal to outer diameters of the first and second washers.

4. The flange gasket of claim 1, wherein the first and second washers are comprised of non-metal and are adhered together with the mesh therebetween using an adhesive.

5. The flange gasket of claim 1, wherein the first and second washers are comprised of non-metal and are heat-welded together with the mesh therebetween.

6. The flange gasket of claim 1, wherein the first and second gasket portions are comprised of non-metal and are adhered together with the first and second washers therebetween using an adhesive.

7. The flange gasket of claim 1, wherein the first and second gasket portions are comprised of non-metal and are welded together with the first and second washers therebetween.

8. The flange gasket of claim 1, further comprising corrugation formed on exterior surfaces of first and second gasket portions around their central bores.

9. The flange gasket of claim 1, wherein each of the first and second gasket portions, and the first and second washers, are comprised of polytetrafluoroethylene (PTFE), and wherein each of the first and second gasket portions comprise a thickness of about 0.0625" and each of the first and second washers comprise a thickness of about 0.020" to 0.040".

10. A flange gasket, comprising:
    a first gasket portion and a second gasket portion, each comprising a central bore;
    a washer secured between the first and second gasket portions, the washer comprising a central bore corresponding to the central bores of the first and second gasket portions, and comprising corrugation formed around its central bore on both faces contacting the first and second gasket portions; and
    a mesh secured to the washer and covering the central bores of the washer and the first and second gasket portions.

11. The flange gasket of claim 10, wherein the mesh comprises a diameter substantially equal to an inner diameter of the washer defining its central bore.

12. The flange gasket of claim 11, wherein the washer and the mesh are comprised of metal, and wherein the mesh is welded to an inner diameter of the washer over its central bore.

13. The flange gasket of claim 10, wherein the washer and the mesh are comprised of non-metal.

14. The flange gasket of claim 13, wherein the mesh is adhered to the washer using an adhesive.

15. The flange gasket of claim 13, wherein the washer and the mesh are welded together.

16. The flange gasket of claim 10, wherein the first and second gasket portions are comprised of non-metal and are adhered together with the washer and mesh therebetween using an adhesive.

17. The flange gasket of claim 10, wherein the first and second gasket portions are comprised of non-metal and are welded together with the washer and mesh therebetween.

18. The flange gasket of claim 10, wherein the first and second gasket portions are comprised of polytetrafluoroethylene (PTFE), and each comprises a thickness of about 0.0625".

* * * * *